(12) United States Patent
Liu et al.

(10) Patent No.: US 8,055,653 B2
(45) Date of Patent: Nov. 8, 2011

(54) PROCESSING OVERLAPPING CONTINUOUS QUERIES

(75) Inventors: Zhen Liu, Tarrytown, NY (US); Srinivasan Parthasarathy, White Plains, NY (US); Anand Ranganathan, White Plains, NY (US); Hao Yang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/836,567

(22) Filed: Aug. 9, 2007

(65) Prior Publication Data

US 2009/0043729 A1  Feb. 12, 2009

(51) Int. Cl.
G06F 17/20 (2006.01)
G06F 15/16 (2006.01)
(52) U.S. Cl. .......................................... 707/718
(58) Field of Classification Search .................... 706/21; 707/719, 720, 718
See application file for complete search history.

(56) References Cited

U.S. PATENT DOCUMENTS 7,269,597 B2 * 9/2007 Stockfisch ............................ 1/1
2004/0133565 A1 * 7/2004 Hinshaw et al. ................... 707/3

OTHER PUBLICATIONS

M. Aguilera, R. Strom, D. Sturman, M. Astley, and T. Chandra. Matching events in a content-based subscription system. In Proc. PODC, 1999.
M. Altinel and M. J. Franklin. E±cient ¯ltering of XML documents for selective dissemination of information. In Proc. VLDB, 2000.
S. Babu, R. Motwani, K. Munagala, I. Nishizawa, and J. Widom. Adaptive ordering of pipelined stream filters. In SIGMOD, pp. 407{418, New York, NY, USA, 2004. ACM Press.
C.-Y. Chan, P. Felber, M. Garofalakis, and R. Rastogi. Efficient filtering of XML documents with XPath expressions. The VLDB Journal, 11(4):354{379, 2002.
J. Chen, D. DeWitt, and J. Naughton. Design and evaluation of alternative selection placement strategies in optimizing continuous queries. In Proc. ICDE, 2002.
J. Chen, D. DeWitt, F. Tian, and Y. Wang. NiagaraCQ: A scalable continuous query system for Internet databases. In Proc. SIGMOD, 2000.
P. A. Chirita, S. Idreos, M. Koubarakis, and W. Nejdl. Publish/ subscribe for RDF-based P2P networks. In Proc. European Semantic Web Symposium, 2004.

(Continued)

*Primary Examiner* — Jean B. Fleurantin
*Assistant Examiner* — Alex Gofman
(74) *Attorney, Agent, or Firm* — F. Chau & Associates, LLC; William J. Stock, Esq.

(57) ABSTRACT

An edge-covering based greedy method for shared filter ordering includes receiving a plurality of queries, wherein each query is a conjunction of filters, and each filter is shared across multiple queries of the plurality of queries, evaluating a unit price of each filter, evaluating, sequentially, each filter in order of a lowest to a highest unit price, to determine a value for each filter, and changing an ordering of the filters according to the values. An edge-covering based harmonic method for shared filter ordering includes receiving a plurality of queries, wherein each query is a conjunction of filters, and each filter is shared across multiple queries of the plurality of queries, evaluating a weight of each filter, evaluating, randomly, each filter having a probability inversely proportionally to its weight, to determine a value, and changing an ordering of the filters according to the values.

12 Claims, 6 Drawing Sheets

OTHER PUBLICATIONS

M. Cilia, C. Bornhoevd, and A. P. Buchmann. CREAM: An infrastructure for distributed, heterogeneous event-based applications. In Proc. International Conference on Cooperative Information Systems, 2003.

A. Condon, A. Deshpande, L. Hellerstein, and N. Wu. Flow algorithms for two pipelined filter ordering problems. In PODS, pp. 193{202, New York, NY, USA, 2006. ACM Press.

G. Cugola, E. D. Nitto, and A. Fuggetta. Exploiting an event- based infrastructure to develop complex distributed systems. In Proc. ICSE, 1998.

N. Dalvi, S. Sanghai, P. Roy, and S. Sudarshan. Pipelining in multi-query optimization. In Proc. PODS, 2001.

J. Hellerstein and M. Stonebraker. Predicate migration: Optimizing queries with expensive predicates. In Proc. SIGMOD, 1993.

S. Madden, M. Shah, J. Hellerstein, and V. Raman. Continuously adaptive continuous queries over streams. In Proc. SIGMOD, 2002.

H. Mistry, P. Roy, S. Sudarshan, and K. Ramamritham. Materialized view selection and maintenance using multi-query optimization. In Proc. SIGMOD, 2001.

K. Munagala, U. Srivastava, and J. Widom. Optimization of continuous queries with shared expensive filters. To appear in Proc. PODS, 2007.

J. Pereira, F. Fabret, H.-A. Jacobsen, F. Llirbat, and D. Shasha. WebFilter: A high-throughput XML-based publish and subscribe system. In Proc. VLDB, 2001.

M. Petrovic, I. Burcea, and H.-A. Jacobsen. S-ToPSS: Semantic Toronto publish/subscribe system. In Proc. VLDB, 2003.

M. Petrovic, H. Liu, and H.-A. Jacobsen. G-ToPSS: Fast filtering of graph-based metadata. In Proc. WWW, 2005.

J. Wang, B. Jin, and J. Li. An ontology-based publish/subscribe system. In Proc. Middleware, 2004.

* cited by examiner

FIG. 10

PROCESSING OVERLAPPING CONTINUOUS QUERIES

BACKGROUND OF THE INVENTION

1. Technical Field

The present invention relates to approximation algorithms and more particularly to a system and method for processing general overlapping queries.

2. Description of Related Art

In relational databases, the problem of multi-query optimizations has been viewed with a focus on relational operators. Continuously Adaptive Continuous Queries (CACQ) seek to optimize the evaluation of continuous queries defined on data streams by sharing relational operators (selections and join state) across queries. It also adapts to changes in operator costs and selectivities over time. Different grouping mechanisms may be used for continuous queries in order to optimize a large number of continuous queries in the Internet. Optimization of a single query with expensive filters (also known as pipelined filter ordering) has been considered. Ordering shared filters which are part of overlapping queries (as considered in this work) is a generalization of ordering pipelined filters that are part of a single query. Shared filter ordering has been identified as a probabilistic generalization of a set-cover problem, which is NP-Hard and hard to approximate within a factor of o(log n) of the optimal solution, where n is the number of queries. The special combinatorial structure in the case of pipelined filter ordering makes it possible to devise algorithms with strong theoretical guarantees: Designing approximation algorithms for the shared filter ordering problem with non-trivial performance guarantees in the case of arbitrarily correlated filters is an open problem.

Efficient evaluation of multiple overlapping queries over data streams has received attention in the context of content-based publish-subscribe systems, wherein they assume that filter evaluations are cheap. This significantly alters the flavor of the problem as the goal becomes one of optimizing the runtime efficiency of the query evaluation algorithm. For example, systems represent stream items using attribute-value pairs, and queries using conjunctions of predicates. These predicates can be evaluated relatively quickly by examining the item, which typically contains small-sized structured text data. Predicate evaluation in semantic pub/sub systems can be accomplished by comparing the arguments (subject and object) of a predicate with the attributes of a stream item. Several systems represent items using XML documents and subscriptions using XPath expressions or its variations. Again, these XPath expressions can be evaluated by examining the item. Since predicate evaluations are not expensive in these systems, their overarching goal is to optimize the runtime efficiency of query resolution algorithms rather than ordering the evaluation of predicates optimally.

Therefore, a need exists for a system and method for processing general overlapping queries in an efficient manner.

SUMMARY OF THE INVENTION

According to an embodiment of the present disclosure, an edge-covering based greedy method for shared filter ordering includes receiving a plurality of queries, wherein each query is a conjunction of filters, and each filter is shared across multiple queries of the plurality of queries, evaluating a unit price of each filter, evaluating, sequentially, each filter in order of a lowest unit price to a highest unit price, to determine a value for each filter, and changing an ordering of the filters according to the values, wherein the ordering of the filters is an evaluation plan having a lowest cost among possible evaluation plans.

According to an embodiment of the present disclosure, an edge-covering based harmonic method for shared filter ordering includes receiving a plurality of queries, wherein each query is a conjunction of filters, and each filter is shared across multiple queries of the plurality of queries, evaluating a weight of each filter, evaluating, randomly, each filter having a probability inversely proportionally to its weight, to determine a value, and changing an ordering of the filters according to the values, wherein the ordering of the filters is an evaluation plan having a lowest cost among possible evaluation plans.

According to an embodiment of the present disclosure, a system for an edge-covering based greedy method for shared filter ordering includes a memory storing a plurality of queries, wherein each query is a conjunction of filters, and each filter is shared across multiple queries of the plurality of queries, and a processor in communication with the memory for receiving the plurality of queries and executing commands for ordering the plurality of queries comprising, evaluating a unit price of each filter, evaluating, sequentially, each filter in order of a lowest unit price to a highest unit price, to determine a value for each filter, and changing an ordering of the filters according to the values, wherein the ordering of the filters is an evaluation plan having a lowest cost among possible evaluation plans.

According to an embodiment of the present disclosure, a system for an edge-covering based harmonic method for shared filter ordering includes a memory storing a plurality of queries, wherein each query is a conjunction of filters, and each filter is shared across multiple queries of the plurality of queries, and a processor in communication with the memory for receiving the plurality of queries and executing commands for ordering the plurality of queries comprising, evaluating a weight of each filter, evaluating, randomly, each filter having a probability inversely proportionally to its weight, to determine a value, and changing an ordering of the filters according to the values, wherein the ordering of the filters is an evaluation plan having a lowest cost among possible evaluation plans.

BRIEF DESCRIPTIONS OF THE DRAWINGS

Preferred embodiments of the present disclosure will be described below in more detail, with reference to the accompanying drawings.

DETAILED DESCRIPTION OF EXEMPLARY EMBODIMENTS

According to an embodiment of the present disclosure, the problem of evaluating multiple continuous queries defined on a data stream is considered, where each query is a conjunction of many filters and each filter may be shared across multiple queries. Efficient support for continuous queries is a critical issue in emerging data stream systems, and this is particularly the case when filters are expensive in terms of their processing time. This problem generalizes other well-known problems such as pipelined filter ordering and set cover, and is not only NP-Hard but also hard to approximate within a factor of o(log n) from the optimum, where n is the number of queries. In this paper, we present two near-optimal approximation algorithms with provably-good performance guarantees for the evaluation of overlapping continuous queries. We present the Greedy algorithm which achieves an approximation ratio of $(1+\log(n)+\log(\alpha))$, where n is the number of queries and $\alpha$ is the average number of filters per query. We also present the randomized, fast, and highly parallel Harmonic algorithm which achieves an approximation ratio of $2\beta$, where $\beta$ is the maximum number of filters in a query. Exemplary algorithms according to an embodiment of the present disclosure have been implemented and evaluated in experiments. The results show that a Greedy algorithm according to an embodiment of the present disclosure consistently outperforms the previously-known best algorithm, while a Harmonic algorithm according to an embodiment of the present disclosure outperforms both of them in a multi-server system.

For evaluating multiple continuous queries defined on a data stream, where each query is a conjunction of filters and each filter may be shared across multiple queries, an evaluation of a specific filter on a specific item in the data stream results in a true or false value; in the former case, the stream item is said to satisfy the filter. If an item satisfies all the filters contained in a query, then the item is said to satisfy the query. For each item in the stream, the subset of queries that are satisfied by the stream item are to be determined. Focusing on a setting where filter evaluations are expensive (i.e., filters incur large evaluation costs), the set of queries that are satisfied by each stream item are determined, while minimizing the total cost of filter evaluations.

As an example, consider a scenario where the law enforcement departments monitor a city through a series of cameras mounted on unmanned aerial vehicles (or UAVs) such as balloons or drones. These UAVs each produces a data stream that contains the images captured by the camera and the GPS location of the UAV, as well as other information such as timestamps, speed and altitude. Users of this system can query for stream items that satisfy certain conditions. For example, one query may be for images in the Bronx area of NYC that indicate car chasing on highways. Another query may be for images in the Bronx that show a mob forming. These two queries overlap, because they share a common filter that the UAV must be located in the Bronx. Evaluation of these queries requires the use of image pattern recognition algorithms for detecting car chases or mobs, as well as spatial filters for deciding whether the GPS coordinates of an UAV fall within the Bronx area. These tasks are computationally intensive, and a naive evaluation strategy may significantly throttle the system throughput. The central problem here is to select the order in which filters need to be evaluated on a stream item so that we can identify all the queries satisfied by the item, while minimizing the total processing cost of the filters.

The optimal filter ordering is jointly decided by many factors including: filter selectivities (i.e., the probability that a stream item satisfies a given filter), filter popularities (i.e., the number of queries that contain a given filter), and the filter costs (i.e., time taken to evaluate a given filter). It is beneficial to first evaluate filters with low selectivity, since it is likely that the stream item will not satisfy this filter, and all the queries that contain this filter may be eliminated from further consideration. For a similar reason, it is also natural to evaluate popular filters first; if a popular filter is not satisfied, it decides many queries through a single evaluation. All other factors being equal, filters with lower costs are preferable to filters with higher costs and need to be evaluated earlier. The complexity in the problem arises from the fact that the three competing factors mentioned above need to be taken the into account in a unified manner, while deciding the order of filter evaluations.

Here, near-optimal, provably good approximation algorithms, for shared filter ordering include a novel edge-coverage based greedy algorithm for the shared filter ordering problem and a Harmonic algorithm, which is a fast, highly parallel, and randomized algorithm for shared filter ordering.

Referring to the edge-coverage based greedy algorithm for the shared filter ordering problem; the cost incurred by this algorithm is guaranteed to be within at most a factor of $(1+\log(n)+\log(\alpha))$ of the optimum, where n is the number of queries and $\alpha$ is the average number of filters per query. This essentially matches the $o(\log(n))$-hardness bound which is the best possible approximation guarantee achievable by any polynomial time algorithm for the shared filter ordering problem. It also significantly improves upon the approximation guarantee of $O(\log^2(n) \cdot \log(l))$ that is achievable through the query-coverage based greedy algorithm, where n denotes the number of queries and l denotes the number of filters in the problem instance.

Referring to the Harmonic algorithm, which is a fast, highly parallel, and randomized algorithm for shared filter ordering; when each query in the problem instance has at most $\beta$-filters, the expected cost of the Harmonic algorithm is guaranteed to be within a factor of $2\beta$ of the optimum. This significantly improves upon the approximation guarantee of $O(\beta^2)$ that is achievable through the hypergraph vertex-covering based algorithm.

A prototype system was implemented based on proposed methods and evaluated. The results show that an edge-coverage based greedy algorithm consistently outperforms the query-coverage based algorithm and is scalable with respect to both the number of queries and the number of filters. Moreover, a Harmonic algorithm can effectively exploit the parallelism in a multi-server system, and reduce the evaluation cost by up to 74% as compared to the other two algorithms.

The near optimal performance guarantees obtained are brought about through the following insight. The shared filter ordering problem may be viewed as one of covering the connections between queries and filters through a suitable choice of filters, rather than covering the queries themselves. Specifically, consider the bipartite graph whose partitions are the set of filters and set of queries respectively; an edge between a filter and query indicates the fact that the filter is present in the corresponding query. For each stream item, evaluating a specific filter (probabilistically) removes (i.e., covers) certain edges in this graph; the actual set of edges that are removed depends upon the structure of the query-filter graph just before the filter was evaluated as well as whether the result of the evaluation was true or false. For each stream item, our goal now becomes that of covering all the edges in the query-filter graph at the lowest possible filter evaluation cost. This transformation in the way the filter ordering problem is viewed has powerful consequences and results in improved performance guarantees. This insight could be of independent interest and applicable to other stochastic query evaluation problems as well.

Referring to the shared filter ordering problem: An instance of the shared filter ordering problem includes a set of queries Q, and a set of filters $\mathcal{F}$ which process the input stream. Each filter $F_i \in \mathcal{F}$ takes a stream item t as input and returns either true or false as output. If filter $F_i$ returns true for item t, we say that t satisfies $F_i$. A query $q \in Q$ is a conjunction of a subset of filters $F(q) \subseteq Q$; if a stream item t satisfies all the filters in $F(q)$, we say that t satisfies query q. For a stream item t, the evaluation plan includes an adaptive ordering of filters $F_{\sigma(1)}$, $F_{\sigma(2)}, \ldots, F_{\sigma(r)}$ such that the following properties hold: (P1): If t satisfies query q, then all the filters in $F(q)$ appear in the adaptive ordering. (P2): If t does not satisfy q, then at least one filter in $F(q)$ which is not satisfied by t appears in the adaptive ordering.

For each query q and stream item t, the evaluation plan can be viewed as providing a confirmation that the stream item t satisfies q or otherwise. The phrase adaptive ordering underscores the fact that the choice of the $(i+1)^{st}$ filter $F_{\sigma(i+1)}$ in the ordering depends on the outcome of the previous i filter evaluations. Typically, a plan could evaluate only a (small) subset of filters in $\mathcal{F}$ in order to determine the queries that are satisfied by the stream item.

Let $s(F_i)$ denote the selectivity of filter $F_i$: this is the (unconditional) probability that a stream item satisfies filter $F_i$. Let $C(F_i)$ denote the processing time (or cost) incurred when filter $F_i$ is applied to a stream item. More generally, the processing time for a filter could be a random variable, in which case we let $C(F_i)$ denote the expected cost of filter $F_i$. All our results continue to hold in this case. Both the $s(\bullet)$ and $C(\bullet)$ values could be time varying characteristics of the input stream; we always refer to their current estimates. The cost of a plan $\mathcal{O}$ is the total time it takes to complete all of its filter evaluations: i.e., $\cos t(\mathcal{O}) \approx \sum_{j=1}^{r} C(F_{\sigma(j)})$.

The Shared Filter Ordering Problem is defined as the problem of computing an evaluation plan for each stream item which satisfies properties (P1) and (P2) such that the expected cost of the plan is minimized.

The expected cost of the plan is defined with respect to the joint distribution of filter satisfaction probabilities, which specifies the probability with which a stream item satisfies a given set of filters. The selectivity of filters are assumed to be independent. Specifically, given that a stream item t satisfies the filters in the set $S_1$ and does not satisfy the filters in the set $S_2$, for any $F_i \notin S_1 \cup S_2$, the probability of t satisfying $F_i$ is equal to the unconditional probability $s(F_i)$. Even with the independence assumption, no optimal polynomial time algorithm, or even a polynomial time approximation algorithm with an approximation ratio o(log n) exists for the shared-filter ordering problem, unless P=NP. In the case of correlated filters, the shared filter ordering methods can be generalized by incorporating conditional filter selectivities; the independence assumption is used only for the sake of analysis.

The notion of a residual graph is implemented in within exemplary methods according to an embodiment of the present disclosure. Consider the current stream item t which is under processing. Let $\mathcal{B}$ be the set of yet-to-be decided queries; $\mathcal{B}$ includes queries $b$ such that no filter in $F(b)$ has been evaluated to false until now, and at least one filter in $F(b)$ is yet-to-be evaluated. Let $\overline{\mathcal{A}}$ denote the set of filters that will not be evaluated in the future for the current stream item. $\overline{\mathcal{A}}$ includes all filters 'a' such that 'a' has already been evaluated, or none of the yet-to-be decided queries ($\mathcal{B}$) contain filter 'a'. Let $\mathcal{A} = \mathcal{F} \setminus \overline{\mathcal{A}}$ be the set of yet-to-be evaluated filters.

A residual graph $\mathcal{G} = (\mathcal{A}, \mathcal{B}, \mathcal{E})$ is a bipartite graph which includes the yet-to-be evaluated filters and the yet-to-be decided queries; an edge $\{a,b\} \in \mathcal{E}$ between a filter 'a' and a query b appears in this graph if filter $a \in F(b)$.

Figure 1:
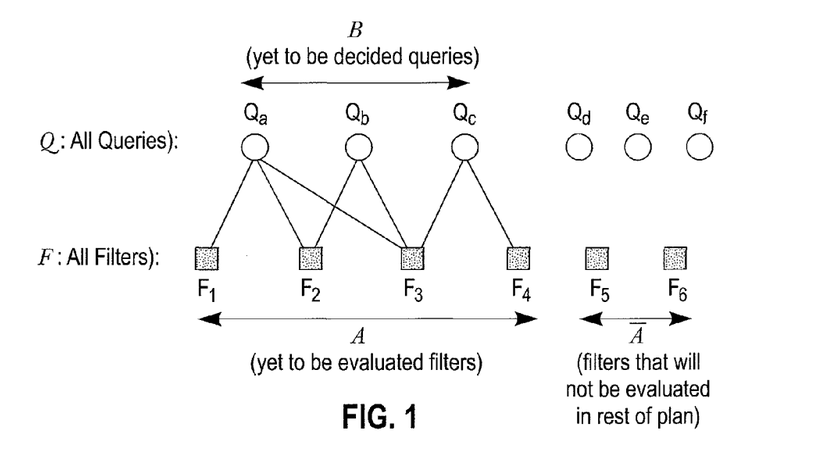
FIG. 1 is an exemplary residual graph.

FIG. 1 illustrates a residual graph. Whenever we refer to an edge $\{a,b\}$ in the residual graph, we will use the convention that 'a' denotes a filter, while b denotes the query. In FIG. 1 three undecided queries ($Q_a$, $Q_b$ and $Q_c$) and four yet-to-be evaluated filters ($F_1, F_2, F_3$ and $F_4$) are depicted. Although shown in the figure, filters $F_5$ and $F_6$ are not part of any yet-to-be evaluated queries and hence are not part of the residual graph; similarly, queries $Q_d$, $Q_e$, and $Q_f$ have already been decided and are not part of the residual graph.

Referring now to a greedy algorithm according to an embodiment of the present disclosure: Recall the notion of a residual graph introduced above, the greedy algorithm evaluates filters one-by-one in a sequential order and terminates when all the queries have been decided. At each step, the choice of the next filter to be evaluated is determined by the current residual graph. Specifically, let $\mathcal{G}_i = (\mathcal{A}_i, \mathcal{B}_i, \mathcal{E}_i)$ denote the residual graph just before the greedy algorithm started the ith filter evaluation. For instance, at the beginning of the algorithm, no filters have been evaluated, and the residual graph $\mathcal{G}_1$ includes all the filters and queries in the input instance. The ith filter to be evaluated is determined as follows: greedy computes the unit-price of each filter in the residual graph $\mathcal{G}_i$; the filter with the least unit-price, $F_{min}$, is evaluated next. After this evaluation, $F_{min}$ is removed from the graph $\mathcal{G}_i$. In addition, any queries that have been decided due to this evaluation, and any other filters which are not part of a yet-to-be decided query are also removed from the graph $\mathcal{G}_i$. This yields the updated residual graph $\mathcal{G}_{i+1}$. The algorithm terminates when all the queries have been decided.

To complete the description of the algorithm, the unit-price is calculated for a filter 'a' in the residual graph $\mathcal{G}_i = (\mathcal{A}_i, \mathcal{B}_i, \mathcal{E}_i)$. The greedy algorithm may be viewed as an incremental edge-covering algorithm. Each filter evaluation results in a subset of the edges in the residual graph being covered. The greedy algorithm terminates when all the edges in the original graph have been covered. Based on this view, the unit-price of a filter is defined such that it is inversely proportional to the expected number of edges it covers, but directly proportional to its cost. Thus, the unit-price of a filter incorporates its selectivity, its popularity, as well as its cost.

Let $\delta(u)$ denote the degree of a node u in $\mathcal{G}_i$. For a filter 'a', define $\Delta_{true}(b) \approx \delta(a)$ and $\Delta_{false}(a) \approx \Sigma_{b|\{a,b\} \in E} \delta(b)$. The former denotes the degree of filter 'a', while the latter denotes the sum of the degrees of all the queries that contain filter 'a'. Recall that C(a) and s(a) denote the cost and selectivity of filter 'a' respectively. The expected number of edges covered if 'a' is evaluated next is: $s(a) \cdot \Delta_{true}(a) + (1-s(a)) \cdot \Delta_{false}(a)$. Specifically, this is the expected number of edges in $\mathcal{G}_i$ that will not appear in $\mathcal{G}_{i+1}$ if 'a' is the ith filter to be evaluated. The unit-price of 'a' is the ratio of its cost and its expected coverage: i.e., $$unitprice(a) = \frac{C(a)}{s(a)\Delta_{true}(a) + (1-s(a))\Delta_{false}(a)}.$$

Figure 2:
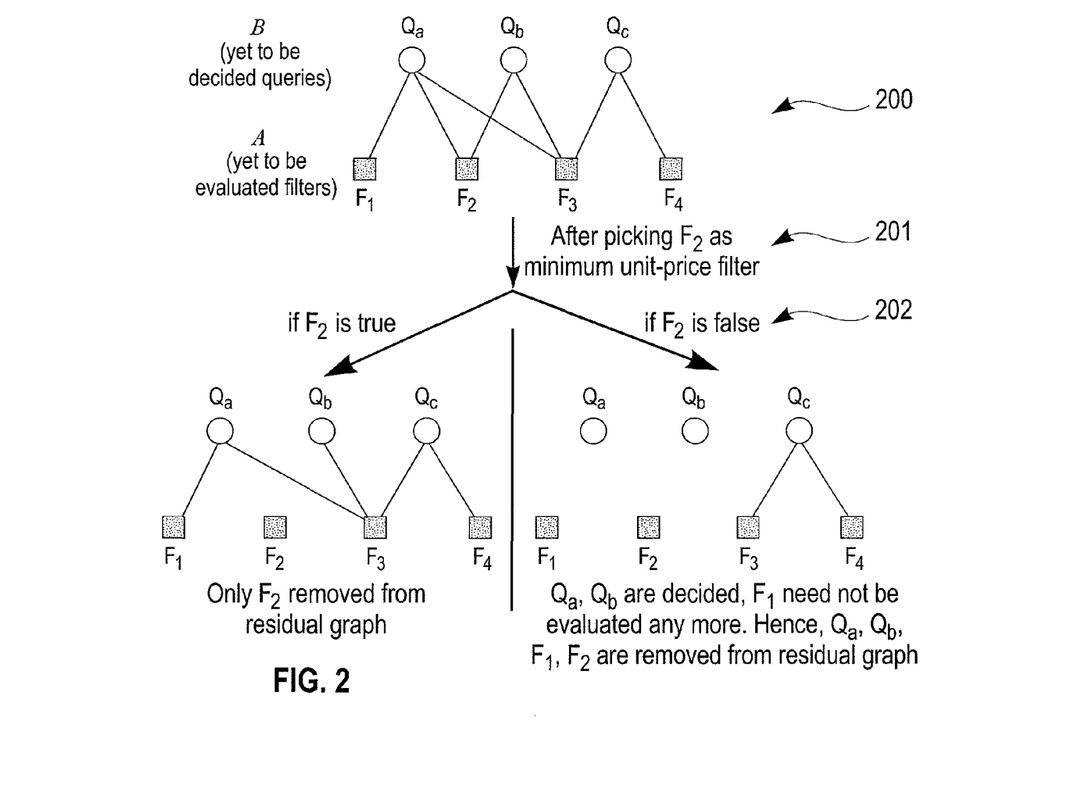
FIG. 2 is a residual graph of an exemplary execution of a greedy method for shared filter ordering according to an embodiment of the present disclosure.

This completes the description of the greedy algorithm. A sample execution of the greedy algorithm is illustrated in FIG. 2. The Greedy algorithm can be implemented by maintaining the current residual graph in an adjacency list data structure, and maintaining the current unit prices of filters in a (min) heap data structure.

The cost performance of the greedy algorithm is shown in Theorem 1.

Theorem 1. The expected cost of the greedy algorithm is at most $H_{n\alpha}$-factor away from the optimal expected cost, where n is the total number of queries, and α is the average number if filters per query. Here, $$H_m \doteq \sum_{j=1}^{m} \frac{1}{j}$$

denotes the $m^{th}$ Harmonic number; since, $H_m < 1 + \log m$ for any $m$, the greedy algorithm has an approximation ratio of at most 1+log n+log α.

The runtime complexity of the greedy algorithm is shown in Theorem 2.

Theorem 2. The worst-case time complexity of the greedy algorithm is O(mβ log(l)) where m is the number of edges in the initial residual graph, β is the maximum number of filters in any query, and l is the number of filters.

FIG. 2 is a sample execution of the Greedy method showing the changes to a residual graph 200; here the Greedy algorithm has determined that filter $F_2$ has the least unit-price 201 and evaluates it 202.

Referring now to a Harmonic method according to an embodiment of the present disclosure: a Harmonic method evaluates filters in the following sequence. Let $\mathcal{G}_i = (\mathcal{A}_i, \mathcal{B}_i, \mathcal{E}_i)$ be the residual graph just before the selection of the ith filter. An arbitrary edge $\{a,b\} \in \mathcal{E}_i$ is selected. Let N(u) denote the set of neighbors for any node u in $\mathcal{G}_i$; for a query b, N(b) denotes the set of filters connected to b in $\mathcal{G}_i$. For each filter $F \in N(b)$, a normalized weight function w(•) is defined as follows: if F=a,w(a)=C(a); else if $$F \neq a, w(f) = \frac{C(F)}{1 - s(F)}.$$

A single random filter T in the set N(b) is selected with probability inversely proportional to its weight and evaluate T. In particular, the probability that a specific filter $T \in N(b)$ is chosen is $$P(T) = \frac{\frac{1}{w(t)}}{\sum_{F \in N(b)} \frac{1}{w(F)}}.$$

Figure 3:
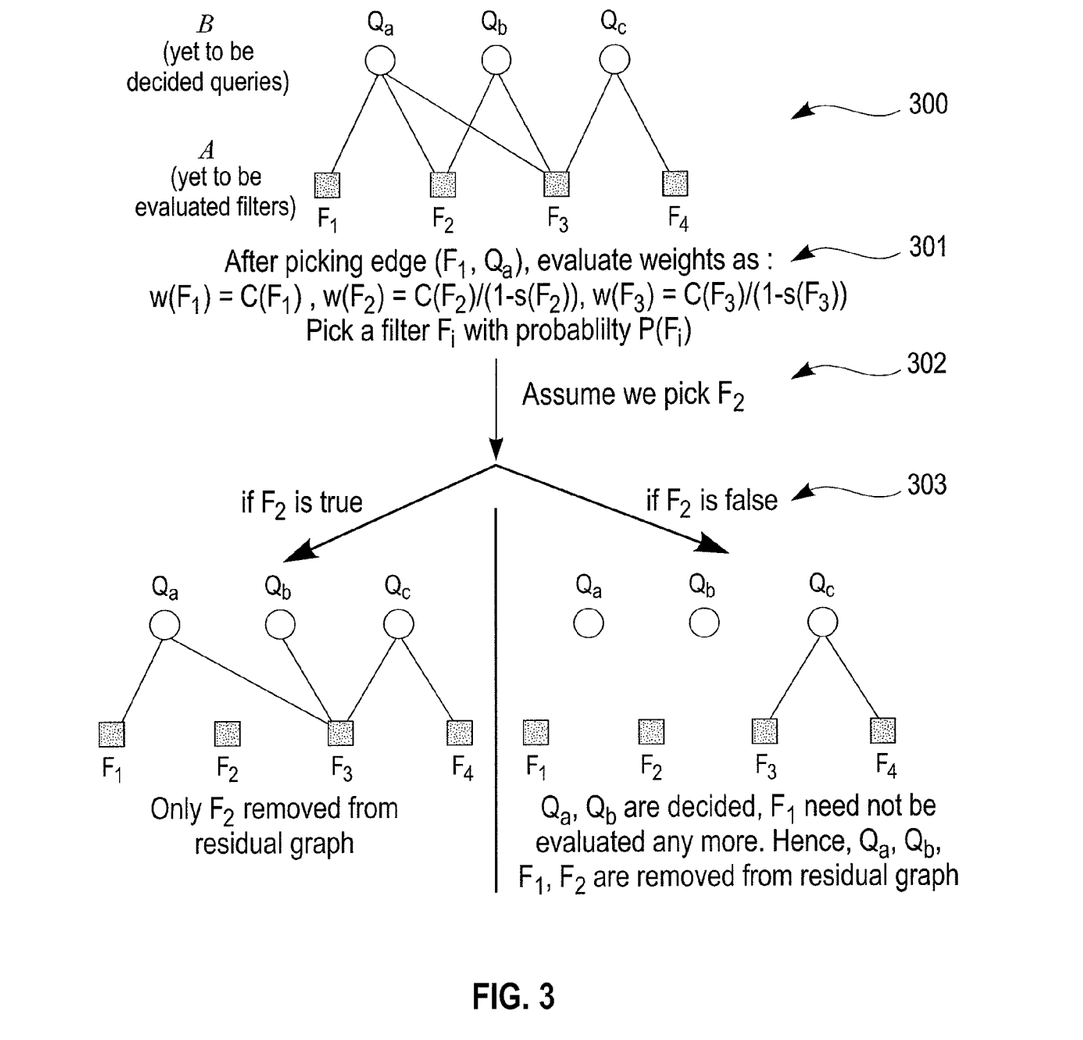
FIG. 3 is a residual graph of an exemplary execution of a harmonic method for shared filter ordering according to an embodiment of the present disclosure.

This filter evaluation is associated with the edge that selected it, and that edge {a,b} is the owner of filter T. After the evaluation, the residual graph is updated by removing this filter, the edges covered by this filter, and newly decided queries, and the filters who are no longer part of any yet-to-be decided queries; this yields the updated residual graph $\mathcal{G}_{i+1}$. The method terminates when all the queries are decided. FIG. 3 illustrates a Harmonic method. The Harmonic methods maintains a current residual graph 300 at any stage and can be implemented easily using an adjacency list data-structure. FIG. 3 is a sample execution of the Harmonic method showing the process of picking an edge and picking a filter 301. Assuming $F_2$ was picked 302, the figure shows possible changes to residual graph after evaluating $F_2$ 303.

The cost performance of the Harmonic algorithm is show in Theorem 3.

Theorem 3. The expected cost incurred by the Harmonic algorithm is at most 2β times the optimal expected cost, where β is the maximum number of filters present in any query.

The runtime complexity of the Harmonic algorithm is shown in Theorem 4.

Theorem 4. The worst-case time complexity of the Harmonic algorithm is O(m+βl) where m is the number of edges in the initial residual graph, β is the maximum number of filters in any query, and l is the number of filters.

A prototype system was implemented for answering continuous queries. Its performance was evaluated using extensive experiments. The results show that a Greedy method according to an embodiment of the present disclosure consistently outperforms the best known algorithm in the single-server cases, and the Harmonic method according to an embodiment of the present disclosure can exploit the parallelism in a multi-server system in a most effective manner.

A prototype system was built based on Java and provides general support for application-specific data streams, as well as the filters over these streams. A user can register his own data type and/or filters using the APIs provided by the system. Moreover, a user can submit a new query or cancel an existing query at any time.

At the core of the system is one or multiple servers that maintain a set of continuous queries and evaluate them against the incoming data streams. To expedite the execution of the evaluation methods, our system has used several efficient data structures internally. Since these methods need to manipulate the query graph extensively, the basic operations of graph lookup and update are fast. For this purpose, the query graph is stored using two hash tables. The first one is indexed by the query id and, for a given query, stores a list of pointers to the remaining filters on this query. Similarly, the second table is indexed by the filter id and, for a given filter, stores a list of pointers to the unresolved queries that contain this filer. As such, the query graph is stored twice (one in each table) and lookup/update can be done in O(1) time for both queries and filters. Also, for the Greedy method, the prices of the filters are maintained in a heap, which takes O(1) time to find the minimum price and logarithm time to update a price.

The system can support multiple servers and exploit the parallelism to reduce the query execution time. The specific manner of parallel execution depends on the algorithm in use. The Harmonic method allows multiple filters to be evaluated simultaneously, as long as they do not appear in the same query. Thus, a fully pipelined system may be implemented, in which one server stores the complete query graph and runs the Harmonic method, while the other servers actually evaluate these filters. Whenever an evaluation server becomes idle, the Harmonic server selects a filter that is disjoint from those filters currently being evaluated (if such a disjoint filter exists), and sends it to the idle server for evaluation.

On the other hand, the Greedy method is sequential, where the next filter it evaluates depends on the outcome of the current evaluation. As such, it cannot be executed in a parallel manner. For such algorithms, parallelism is achieved in a multi-server system by splitting the query graph among the servers. Currently, when a query arrives, it is randomly assigned to the servers with equal probability. That is, with k servers and n queries in total, each server holds a disjoint subset of queries, which has n/k queries on average. A server also stores all filters on each query that it holds, so that it can evaluate this query independently. Clearly, such a random split of queries may not be the best strategy; however, we leave the optimal query partitioning problem for the future study (this problem is NP-Hard).

The performance of the systems were evaluated on multiple Linux servers, each with Xeon 3.4 GHz CPU and 2 GB memory. The experiments were conducted using a synthetic workload. The workload defines a set of queries, filters, and data streams that are used to drive an experiment. The parameters used in synthesizing the workload are listed in Table 1.

TABLE 1

| parameter | description | default values |
|---|---|---|
| $N_q$ | number of queries | 10,000 |
| $N_f$ | number of unique filters | 3000 |
| $N_o$ | number of streaming data objects | 10,000 |
| model | popularity distribution of the filters | Zipf ($\alpha = 1$) |
| $[l_{min}, l_{max}]$ | minimum/maximum query length (i.e., number of filters in a query) | [3, 10] |
| $[s_{min}, s_{max}]$ | minimum/maximum filter selectivity | [0.01, 0.3] |
| $[c_{min}, c_{max}]$ | minimum/maximum filter cost | [1, 10] |
| k | number of parallel servers | 1 |

In each experiment, a set of $N_f$ unique filters were generated and associated with each of them were a popularity weight based on a given popularity model. Each filter also has a cost and a selectivity randomly chosen from $[c_{min}, c_{max}]$ and $[s_{min}, s_{max}]$ respectively. A set of $N_q$ queries were generated, each with a length randomly between $l_{min}$ and $l_{max}$. For a given query with length l, l filters with probabilities proportional to their popularity weights are attached. No stream data items were generated, each of which is represented by a $N_f$-bits vector. The i-th bit in this vector indicates whether the data satisfies the i-th filter, which is set to 1 with a probability equal to the filter's selectivity. After the workload is generated, it was feed into the system and compare the performance of different algorithms. For each set of parameters, the experiments were repeated multiple times and the results reported below are the average over these runs.

The popularity distribution of the filters plays an important role in our experiments, because it impacts the degree of filter sharing across the queries. Most of our experiments are conducted using the Zipf distribution, which is well known as a good fit for keyword popularity in text-based searches. With Zipf distribution, the popularity of the i-th most popular filter is inversely proportional to it's rank i, i.e., $f_i \propto 1/i^\alpha$. However, we have also cross-validated our findings using other popularity models, such as uniform distribution in which each filter's popularity weight is randomly chosen from [0, 1].

The metric of interest is the evaluation cost, defined as the average cost of evaluating all queries against a newly arrived streaming data. This cost metric reflects the amount of time that the system takes to process the streaming data. For example, a filter with a cost of 1 takes one unit time to evaluate. In the single-server case, the evaluation cost is simply the sum of the cost of all filter evaluations. In the multi-server case, the evaluation cost is defined as the largest cost incurred on any server. This is because the system-wide query evaluation finishes only when the last server finishes. The evaluation algorithm's execution time is assumed to be negligible as compared to the filter evaluation time, thus can be ignored in the cost. Runtime performance of different algorithms is discussed herein.

For comparison purpose, an S-Greedy method is also implemented. The S-Greedy method has a specific price function based on which the filters are ordered. In the S-Greedy method, the price of a filter a is defined as $$\frac{C(a)}{(1-s(a))p(a)},$$

where C(a) and s(a) are the cost and selectivity of a respectively, and p(a) is the number of unresolved query that a occurs in. To achieve fair and meaningful comparison, in one set of experiments, we vary only one parameter while fixing the other parameters as the defaults values shown in Table 1, unless otherwise mentioned.

Referring now to experimental results which compare Greedy and Harmonic methods to S-Greedy. One question we seek to answer in the experiments is how well different algorithms perform as the query graph grows. Note that the size of a query graph can be measured by both the number of queries and the number of filters. Therefore, experiments were conducted to evaluate their impact respectively. In the first set of experiments, the number of filters were fixed as 1000 and vary the number of queries from 2K to 18K, with increments of 4K.

Figure 4:
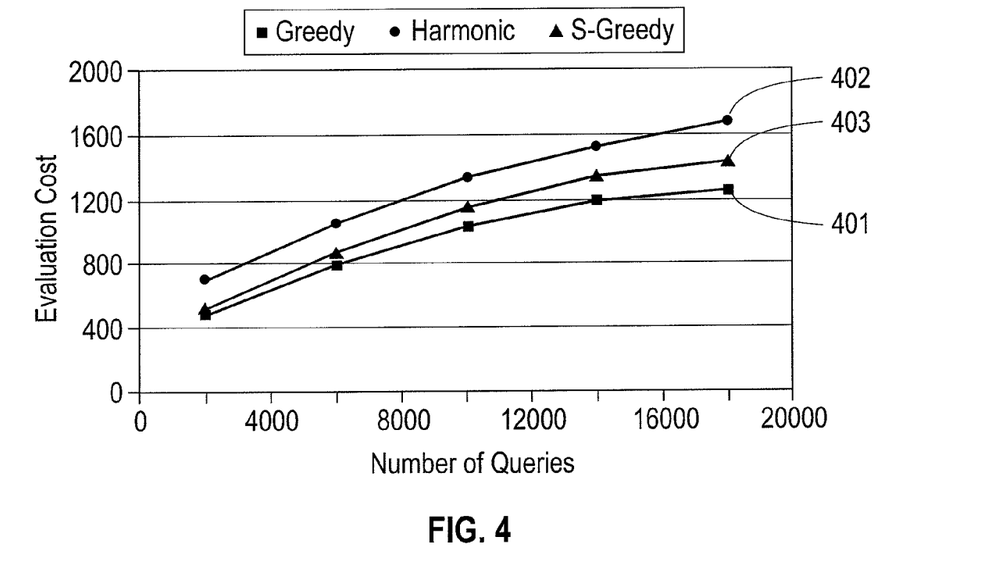
FIG. 4 is a graph of evaluation cost vs. number of queries according to an embodiment of the present disclosure.

FIG. 4 shows the evaluation cost of different methods in these experiments. The Greedy method 401 consistently outperforms the other two algorithms. For example, with 14K queries, the evaluation cost incurred by Greedy is 1187.3, while the evaluation costs with S-Greedy 403 and Harmonic 402 are 1349.7 and 1524.6 respectively. In other words, Greedy 401 can reduce the evaluation cost by 13.7% as compared to S-Greedy 403, and 28.4% as compared to Harmonic 402.

The performance of Greedy 401 degrades slower than the other two algorithms as the number of queries increases. As such, the performance gap between Greedy 401 and S-Greedy 403 or Harmonic 402 is more significant in a large system with more queries submitted. Moreover, the evaluation cost for Greedy 401 as well as Harmonic 402 increases sub-linearly with respect to the number of queries, which is clearly a desirable feature from the scalability perspective.

The absolute cost values shown in FIG. 4 indicate that all three algorithms have optimized the query evaluation process. Based on the parameters in Table 1 and back-of-the-envelope calculation, one can see that a naive system, which evaluates the queries independently, would incur an expected cost of 112:5K for 18K subscriptions, which is two orders of magnitude higher than the cost shown in the figure.

Next the scalability of these algorithms is evaluated as the number of filters increases. In these experiments, the number of queries were fixed as 10K and change the number of unique filters from 1000 to 9000. The experiment results are plotted in FIG. 5. All three algorithms can achieve sub-linear cost increase when the query graph contains more filters. However, Greedy 401 and S-Greedy 403 perform better than Harmonic 403 in terms of scalability to the number of filters. This shows their common greedy structure helps in finding the filter whose evaluation is most beneficial, as opposed to the "ad-hoc" filter selection in Harmonic.

The previous experiment results described herein are obtained in a single-server system. Turning now to the study of the degree of parallelism of these algorithms by evaluating their performance in a multi-server system; In this set of experiments, the number of queries and filters are fixed as 10K and 3K respectively, but gradually add more servers into the system. The evaluation cost in such a multi-server system is defined as the largest cost incurred on any server.

Figure 6:
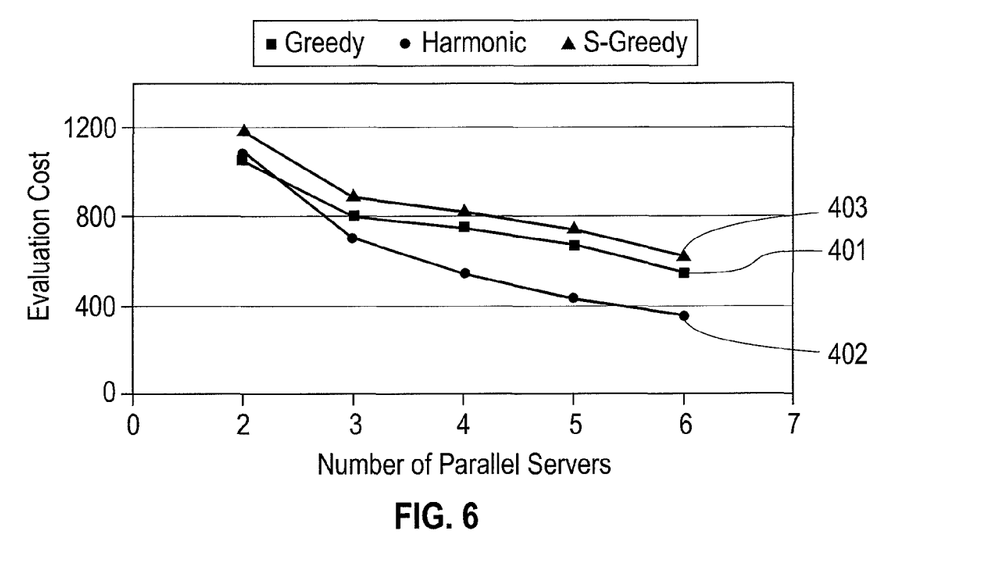
FIG. 6 is a graph of evaluation cost vs. number of parallel servers according to an embodiment of the present disclosure.

FIG. 6 plots the evaluation cost of different algorithms when the number of servers increases from 2 to 6. The Harmonic method 403 is consistently the best algorithm for a multi-server system (except a tie with Greedy 401 in the 2-server case). For example, with five servers, Harmonic 402 can effectively drop the cost to 427.1, while the costs with Greedy 401 and S-Greedy 403 are 663.2 and 743.7 respectively, which are 55~74% higher than that of Harmonic 402.

Figure 5:
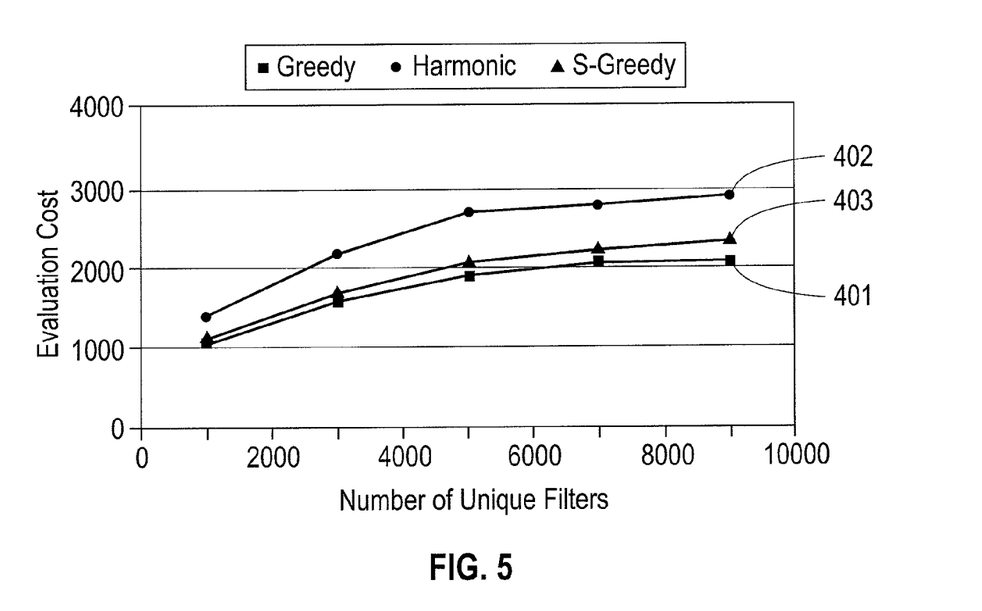
FIG. 5 is a graph of evaluation cost vs. number of unique filters according to an embodiment of the present disclosure.

Note the above finding is exactly the opposite as the comparison in the single-server cases | As shown in FIGS. 4 and 5, Harmonic 402 performs the worst among the three algorithms in all single-server cases. The fundamental reason for such a transition is, not surprisingly, the parallelism that Harmonic 402 can inherently support. While the "ad-hoc" filter selection in Harmonic 402 is deemed lack of optimization on a single server, it can exploit the opportunity of multiple servers with parallel, pipelined filter evaluation. On the other hand, the sequential nature of the greedy methods precludes parallel execution, yet the workaround of query splitting may reduce the system efficiency. This is because with query splitting, a filter may be replicated on multiple servers, and hence evaluated multiple times, if it is shared by queries which happen to be allocated to different servers. Hence, as more parallel servers exist in the system, the advantage of Harmonic 402 over Greedy 401/S-Greedy 403 becomes more apparent, as shown in FIG. 6.

Given that the Greedy, Harmonic and S-Greedy algorithms are all optimized for overlapping queries, their performance clearly depends on the degree of filter sharing in the actual queries. Intuitively, the more sharing among the queries, the better performance one would expect from these algorithm. However, the sharing structure in a large query graph is difficult to characterize and may be affected by many factors. In what follows, we study the impact of two important issues of such a kind, namely the filter popularity distribution and the query length.

As discussed earlier, the Zipf distribution (with $\alpha=1$) may be used in the experiments, because it has been shown to fit fairly well with user search behavior in practice. With Zipf distribution, a few most popular filters appear in many queries, while many unpopular filters appear in only a few queries. With a larger $\alpha$, the most popular filters gain even more weights, leading to even more unbalanced popularity among the filters.

Figure 7:
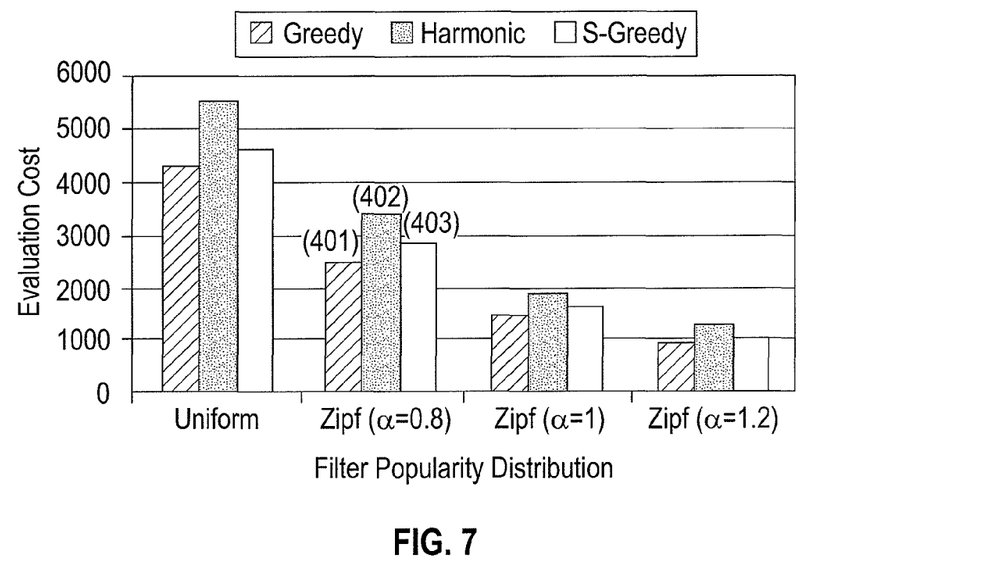
FIG. 7 is a graph of evaluation cost vs. filter popularity distribution according to an embodiment of the present disclosure.

Experiments have been conducted to study the impact of query popularity distribution. The number of queries and filters are fixed as 10K and 2K respectively. The results of evaluation costs are shown in FIG. 7 for Zipf distribution (with different $\alpha$) as well as uniform distribution. Different query graph sizes and query lengths have been evaluated and similar results hold.

From FIG. 7 it can be determined that the relative order of the three algorithms' performance is not affected by the popularity distribution. The comparison presented elsewhere in this section is quite general and holds for a wide variety of scenarios. Further, all three algorithms can benefit from the increased degree of query overlap, as the distribution changes from Uniform to Zipf and then the exponent $\alpha$ in Zipf increases. In fact, as the sharing continues to enhance, the performance gap between these algorithms shrinks. This is because with highly unbalanced filter popularities, many queries become largely similar, if not identical, to each other.

Figure 8:
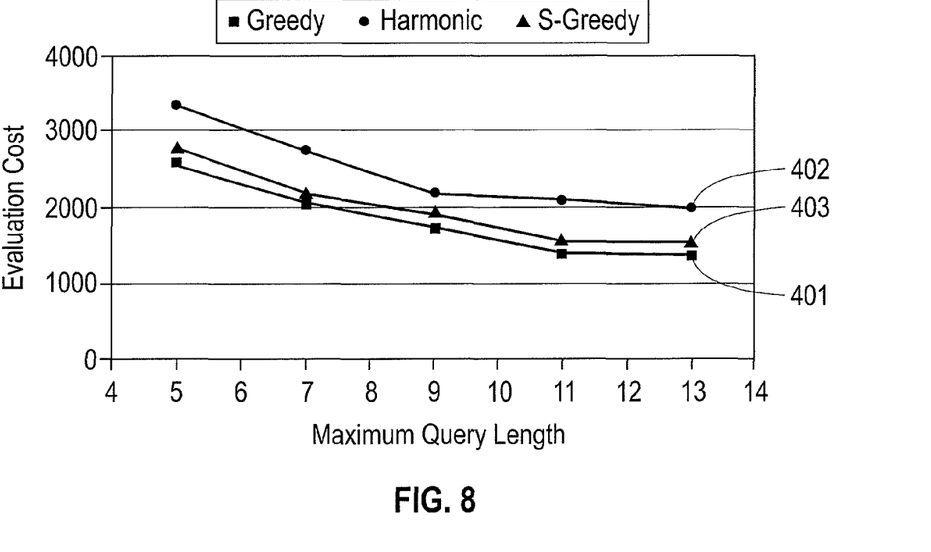
FIG. 8 is a graph of evaluation cost vs. query length according to an embodiment of the present disclosure.

Turning to the impact of query length (i.e., how many filters does a query contain), which also implicitly controls the degree of query overlap; In each of these experiments, we have 10K queries and 3K filters. Each query has at least three filters; however, the maximum query length varies between five and thirteen. The actual length of an arbitrary query is a random variable chosen from $[3, l_{max}]$. The evaluation costs with queries of different lengths are plotted in FIG. 8. One can readily see that all three algorithms benefit from longer queries, and that the impact of query length is almost the same for Greedy 401 and S-Greedy 403. This seems consistent with our intuition that the longer queries are more likely to share filters, hence the algorithm performance can be improved. However, there is another factor that also plays a role here: Given the same selectivity of the filters, a longer query is less likely to be satisfied. Note that if a query is satisfied, any algorithm must evaluate all its filters; however, if a query is not satisfied, in an ideal case, evaluating only one of its filters would suffice. In this sense, with longer queries, the amount of evaluation "workload" drops. Nevertheless, FIG. 8 shows that these three algorithms can indeed leverage such an opportunity and reduce their respective evaluation costs.

Figure 9:
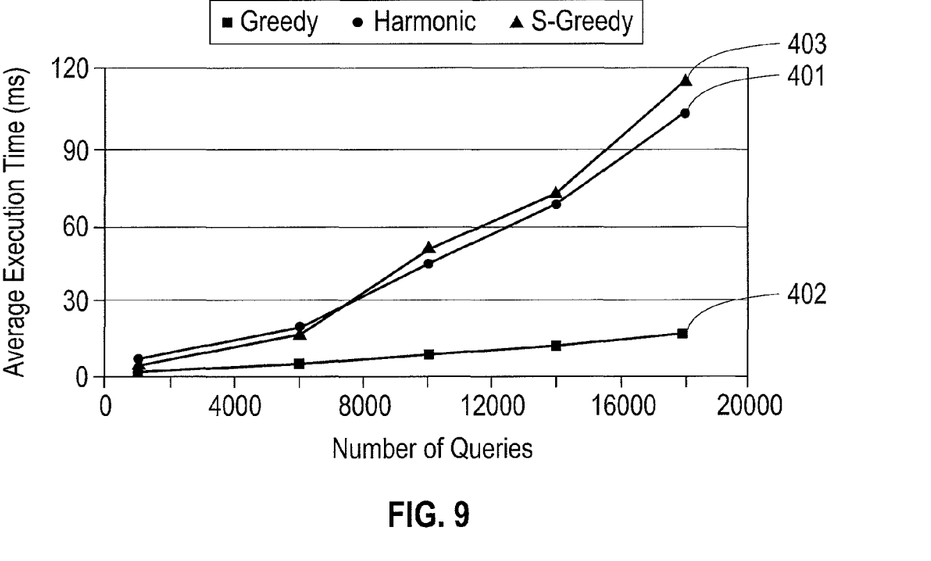
FIG. 9 is a graph of execution time of different methods according to an embodiment of the present disclosure.

FIG. 9 shows the execution time of these evaluation algorithms themselves, as the number of queries increases. The number of filters are fixed as 2K in these experiments. The Harmonic method is shown to be faster than both Greedy 401 and S-Greedy 403. Moreover, its execution time increases much slower as the underlying query graph grows. This is because Harmonic does not need to maintain or update any states (e.g., price in Greedy 401 and rank in S-Greedy 403) for the filters. Such runtime efficiency makes Harmonic a good candidate for those scenarios in which the system needs to handle a vast amount of concurrent data streams, hence the server running the evaluation algorithm may become the performance bottleneck.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 10:
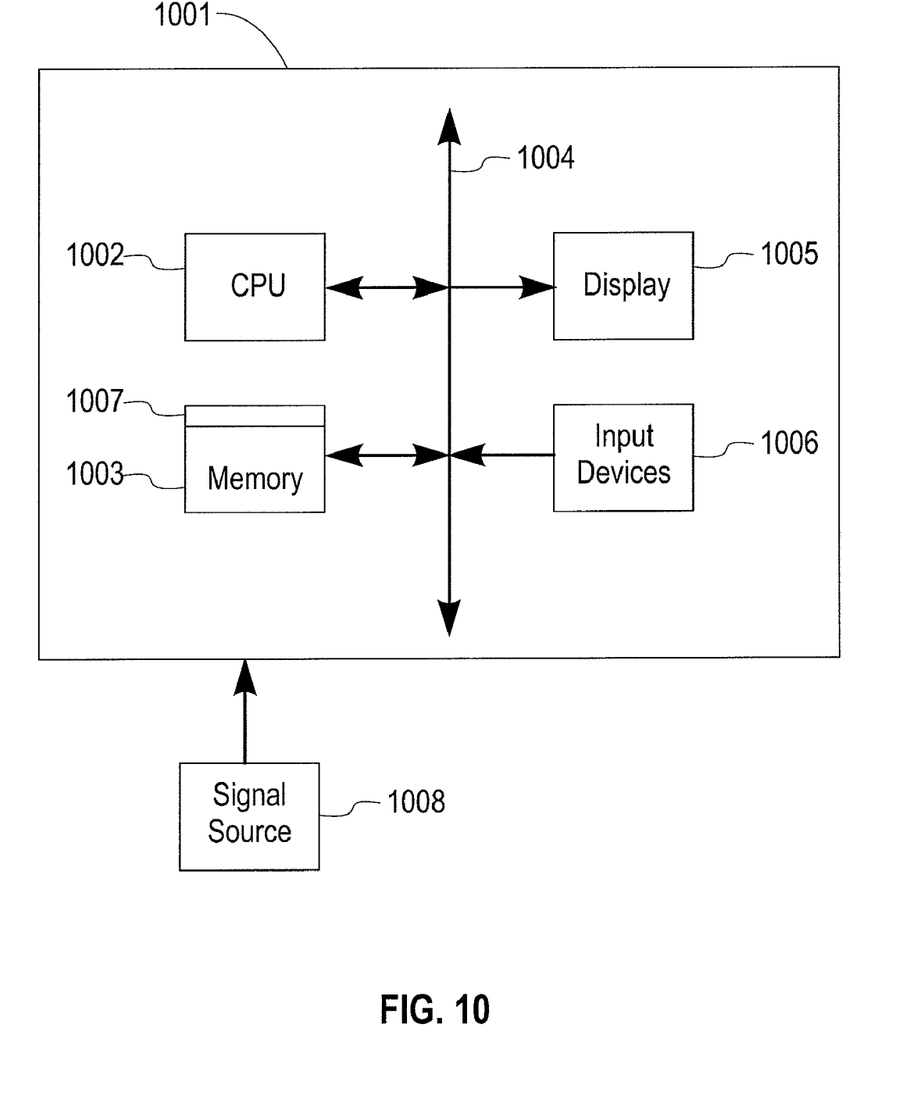
FIG. 10 is a diagram of a system according to an embodiment of the present disclosure.

Referring to FIG. 10, according to an embodiment of the present invention, a computer system 501 implementing a method for processing overlapping continuous queries can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, or a combination thereof. The present invention can be implemented as a routine 1007 that is stored in memory 1003 and executed by the CPU 1002 to process the signal from the signal source 1008. As such, the computer system 1001 is a general-purpose computer system that becomes a specific-purpose computer system when executing the routine 1007 of the present invention.

The computer platform 1001 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for processing overlapping continuous queries, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer readable medium embodying instructions executable by a processor to perform a method for an edge-covering based greedy method for shared filter ordering, the method comprising:
   receiving a plurality of queries, wherein each query is a conjunction of filters, and each filter is shared across multiple queries of the plurality of queries;
   evaluating a unit price of each filter;
   evaluating, sequentially, each filter in order of a lowest unit price to a highest unit price, to determine a value for each filter; and
   changing an ordering of the filters according to the values, wherein the ordering of the filters is an evaluation plan having a lowest cost among possible evaluation plans,
   wherein evaluating, sequentially, each filter further comprises removing an evaluated filter and removing at least one filter sharing at least one query with the evaluated filter,
   wherein the evaluated filter is false, and skipping to a subsequent filter not removed from the ordering.

2. The method of claim 1, wherein the plurality of queries and filters area arranged in a residual graph having edges between queries and corresponding filters, wherein each filter evaluation results in a subset of edges in the residual graph being covered.

3. The method of claim 2, wherein the method terminates upon covering all edges.

4. A computer readable medium embodying instructions executable by a processor to perform a method for an edge-covering based harmonic method for shared filter ordering, the method comprising:
   receiving a plurality of queries, wherein each query is a conjunction of filters, and each filter is shared across multiple queries of the plurality of queries;
   evaluating a weight of each filter;
   evaluating, randomly, each filter having a probability inversely proportionally to a respective weight, to determine a value;
   changing an ordering of the filters according to the values, wherein the ordering of the filters is an evaluation plan having a lowest cost among possible evaluation plans,
   wherein the plurality of queries and filters area arranged in a residual graph having edges between queries and corresponding filters, wherein each filter evaluation results in a subset of edges in the residual graph being covered; and
   updating the residual graph by removing an evaluated filter, edges covered by the evaluated filter, newly decided queries, and any filter that is not longer part of any yet-to-be decided queries.

5. The method of claim 4, wherein the method terminates upon deciding all queries.

6. The method of claim 4, wherein the method is performed in parallel on a plurality of interconnected systems.

7. A system for an edge-covering based greedy method for shared filter ordering comprising:
   a memory storing a plurality of queries, wherein each query is a conjunction of filters, and each filter is shared across multiple queries of the plurality of queries; and
   a processor in communication with the memory for receiving the plurality of queries and executing commands for ordering the plurality of queries comprising,
   evaluating a unit price of each filter;
   evaluating, sequentially, each filter in order of a lowest unit price to a highest unit price, to determine a value for each filter; and
   changing an ordering of the filters according to the values, wherein the ordering of the filters is an evaluation plan having a lowest cost among possible evaluation plans,
   wherein evaluating, sequentially, each filter further comprises removing an evaluated filter and removing at least one filter sharing at least one query with the evaluated filter, wherein the evaluated filter is false, and skipping to a subsequent filter not removed from the ordering.

8. The system of claim 7, wherein the plurality of queries and filters area arranged in a residual graph stored in the memory having edges between queries and corresponding filters, wherein each filter evaluation results in a subset of edges in the residual graph being covered.

9. The system of claim 8, wherein the processor terminates the execution upon covering all edges.

10. A system for an edge-covering based harmonic method for shared filter ordering comprising:
   a memory storing a plurality of queries, wherein each query is a conjunction of filters, and each filter is shared across multiple queries of the plurality of queries; and
   a processor in communication with the memory for receiving the plurality of queries and executing commands for ordering the plurality of queries comprising,
   evaluating a weight of each filter;
   evaluating, randomly, each filter having a probability inversely proportionally to a respective weight, to determine a value;
   changing an ordering of the filters according to the values, wherein the ordering of the filters is an evaluation plan having a lowest cost among possible evaluation plans,
   wherein the plurality of queries and filters area arranged in a residual graph stored in the memory having edges between queries and corresponding filters, wherein each filter evaluation results in a subset of edges in the residual graph being covered; and
   updating the residual graph by removing an evaluated filter, edges covered by the evaluated filter, newly decided queries, and any filter that is not longer part of any yet-to-be decided queries.

11. The system of claim 10, wherein the processor terminates the execution upon deciding all queries.

12. The system of claim 10, interconnected with at least one other system for executing the commands for ordering the plurality of queries in parallel.

* * * * *